United States Patent Office 3,188,271
Patented June 8, 1965

3,188,271
3α-ACID ESTERS OF 3α-HYDROXY-5β-PREGNANE-11,20-DIONE
Lewis H. Sarett, Princeton, N.J., assignor to Merck & Co., Inc., Rahway, N.J., a corporation of New Jersey
No Drawing. Filed May 16, 1956, Ser. No. 585,163
10 Claims. (Cl. 167—52)

This invention relates to novel water soluble steroid compounds. More particularly, it is concerned with water soluble derivatives of 3α-hydroxy-11,20-diketo pregnane and processes of preparing the same.

In accordance with this invention, it is now found that water soluble derivatives of 3α-hydroxy-11,20-diketo pregnane exhibit a pronounced depressor effect on the central nervous system and are useful anaesthetic agents. These new products are unique in that they possess little or no hormonal activity but do have pronounced pharmacological activity as nervous system depressants.

It is an object of the present invention to provide these new water soluble derivatives of 3α-hydroxy-11,20-diketo pregnane and pharmaceutical compositions of the same. A further object is to provide processes for the preparation of these water soluble derivatives. Another object is to provide new intermediate products useful in preparing water soluble derivatives of 3α-hydroxy-11,20-diketo pregnane. Other objects will be apparent from the detailed description hereinafter provided.

It is now found, in accordance with the present invention, that 3α-hydroxy-11,20-diketo pregnane can be made water soluble through the addition of a polar group at the 3 position. The principal function of this polar or ionic group is to render the steroid water soluble in a form suitable for administration. Since the pharmacological activity of the water soluble derivative is due primarily to the steroid moiety, the polar or solubilizing group should be readily hydrolyzed on administration to yield the steroid nucleus.

Pursuant to a specific embodiment of the present invention, it is now found that the salts of acid esters of 3α-hydroxy-11,20-diketo pregnane are particularly useful derivatives which are very effective in their action as central nervous system depressants. The salts of acid esters of 3α-hydroxy-11,20-diketo pregnane derived from polycarboxylic acids having from four to eight carbon atoms are especially useful and are the preferred embodiments of the present invention. Thus, salts of acid esters such as the 3-hemisuccinate, the 3-hemitartrate, the 3-hemiglutarate, the 3-citrate, the 3-tricarballyate, and the like are particularly useful water soluble derivatives of 3α-hydroxy-11,20-diketo pregnane.

These acid esters are readily prepared by intimately contacting 3α-hydroxy-11,20-diketo pregnane with the polycarboxylic acid anhydride in the presence of a suitable organic base, such as pyridine. Thus, the hemisuccinate derivative is conveniently prepared by reacting 3α-hydroxy-11,20-diketo pregnane with succinic anhydride in the presence of pyridine. The desired hemisuccinate ester is then recovered by acidifying the resulting reaction mixture and extracting the hemisuccinate ester with a suitable solvent such as ether. In similar manner other acid esters of 3α-hydroxy-11,20-diketo pregnane are produced.

The new acid esters of the present invention are characterized by their solubility in aqueous solutions of various bases. Thus, the acid esters can be dissolved in aqueous solutions containing the required stoichiometric amount of base necessary to form the salt of the acid ester. For example, solutions of the sodium salt are obtained by adding an acid ester to an aqueous solution of sodium bicarbonate. If desired, the salt of the acid ester can be isolated in solid form, for example, by lyophilizing the aqueous solution of the salt. Various salts of the acid esters in which the cation is a pharmacologically acceptable cation commonly used in pharmacology to neutralize acidic medicinal agents when the salt thereof is to be used therapeutically, can be used as anesthetic agents. Examples of such cations that might be mentioned are sodium, potassium, ammonium, and substituted ammonium ions containing lower alkyl, hydroxy-lower alkyl, acyloxy-lower alkyl, amino-lower alkyl, aryl or aralkyl groups, each group containing up to ten carbon atoms. The sodium salts of the acid esters are particularly suitable for administration and therefore represent preferred embodiments of the present invention.

The following examples are present as illustrative of methods of making the new water soluble derivatives of 3α-hydroxy-11,20-diketo pregnane.

Example 1

To a solution of 1 gram of 3α-hydroxy-11,20-diketo pregnane melting at 170–172° C. in 5 ml. of pyridine is added 1 gm. of finely powdered succinic anhydride. The resulting mixture is heated on the steam bath under reflux for about one hour. To the reaction mixture is then added about 100 ml. of water. The resulting aqueous solution is acidified to a pH of 3 with dilute hydrochloric acid and extracted three times with 25 ml. of ethyl ether. The ether extracts are then washed with two 25 ml. portions of water and finally dried over sodium sulfate. Evaporation of the ethyl ether extract affords crystalline 3α-hydroxy-11,20-diketo pregnane 3-hemisuccinate melting at 162–168° C. Recrystallization of this product from aqueous methanol yields crystalline product melting at 162–169° C. Recrystallization of the product from ethyl acetate affords crystals melting at 169–171° C., with sintering at 164° C.

Example 2

To a mixture of 1 gm. of 3α-hydroxy-11,20-diketo pregnane 3-hemisuccinate in 15 ml. of water is added 0.19 gms. of sodium bicarbonate with warming. The resulting solution of the sodium salt of 3α-hydroxy-11,20-diketo pregnane 3-hemisuccinate is then lyophilised to obtain the product in solid form.

Example 3

Following the procedure described in Example 2 the potassium salt of 3α-hydroxy-11,20-diketo pregnane 3-hemisuccinate is obtained when the required stoichiometrical amount of potassium bicarbonate is substituted for the sodium bicarbonate.

Example 4

Following the procedure described in Example 2, the ammonium salt of 3α-hydroxy-11,20-diketo pregnane 3-hemisuccinate is prepared by substituting the required stoichiometrical amount of ammonium bicarbonate for the sodium bicarbonate.

Example 5

To a solution of 1 gm. of 3α-hydroxy-11,20-diketo pregnane in 5 ml. of pyridine is added 1 gm. of glutaric acid anhydride. The resulting mixture is heated on a steam bath under reflux for about one hour. To the resulting reaction mixture is then added about 100 mls. of cold water. The resulting aqueous solution is acidified to a pH of 3 with dilute hydrochloric acid and extracted three times with 25 mls. of ether. The ether extract is then washed with two 25 ml. portions of water and finally dried over sodium sulfate. Evaporation of the ether extracts affords crystalline 3α-hydroxy-11,20-diketo pregnane 3-hemiglutarate.

Example 6

Following the procedure described in Example 5, a mixture of the hemimaleate and hemifumarate of 3α-hydroxy-11,20-diketopregnane is obtained when maleic anhydride is substituted for glutaric anhydride. To a solution of 1 gm. of the mixed acid esters in 100 parts of acetone is added 400 mg. of powdered potassium permanganate. After stirring the solution for 15 minutes, a solution of 0.5 gm. of sodium bisulfite in 10 ml. of water is added and the acetone removed in vacuo. Acidification of the resulting suspension to pH 3 with aqueous sulfuric acid is followed by extraction with three 50 ml. portions of ether. Evaporation of the ether gives a residue consisting of isomeric acid tartrates of 3α-hydroxy-11,20-diketopregnane which can be further purified by conventional means.

Example 7

Following the procedures of Example 5 the tricarballylate ester of 3α-hydroxy-11,20-diketopregnane is obtained as an amorphous solid when tricarballylic acid anhydride is substituted for the glutaric acid anhydride.

Example 8

To a solution of 71 mg. of ethanolamine in 25 ml. of water is added 500 mg. of 3α-hydroxy-11,20-diketo pregnane 3-hemiglutarate (Example 5) of water. The resulting clear aqueous solution is lyophilized to produce the ethanol amine salt in the form of a solid.

In the same manner the diethanolamine, dimethylamino ethanol, procaine, trimethylamine, dimethylbenzylamine, triethylamine, diethylamine, and N,N'-tetramethyl hexamethylenediamine salts of the acid esters described in Examples 1 and 5–8 are obtained, namely, by reacting one molar equivalent of the acid salt with one molar equivalent of the amine in an aqueous solution. The solution of the amine salt can then be lyophilized to produce the salt in solid form.

As stated above, the novel water soluble derivatives of the present invention have valuable pharmacological properties. Thus, the salts of the 3α-hydroxy-11,20-diketo pregnane acid esters are active anesthetics and can be used to anaesthetize animals, such as dogs, cats and the like for surgery. For this purpose the salts of the acid esters can be administered intravenously in dosages ranging from about 1 mg. to 100 mg./kg. For example, dogs can be anaesthetized by the intravenous administration of an aqueous-alcohol solution containing 2.5 mg./kg. of the sodium salt of the hemisuccinate of 3α-hydroxy-11,20-diketo pregnane. At this dosage level the anaesthesia is of about one-half hour duration. When this sodium hemisuccinate salt is administered at higher dosage levels, longer periods of anaesthesia result. In the same manner the other acid esters of 3α-hydroxy-11,20-diketo pregnane described above are useful for administration to other animals, including human beings, and are particularly useful in veterinary and human surgery.

The compounds of the present invention can also be employed in aqueous solutions containing other substances, for example, glucose or sodium chloride to make them isotonic. The new water soluble derivatives of 3α-hydroxy-11,20-diketo pregnane can be combined with a variety of pharmaceutically acceptable carriers, the choice of which will depend upon the method by which the agent is to be administrated. Thus, for oral administration the active agent can be used in the form of tablets, elixir or suspension in a suitable carrier. Such pharmaceutical preparations can be prepared in accordance with methods well-known in the pharmaceutical art. Alternatively, the 3α-hydroxy-11,20-diketo pregane per se can be administered in aqueous or aqueous-alcoholic solution by the use of suitable solubilizing solutions.

Various changes and modifications in the procedures herein disclosed will occur to those skilled in the art, and to the extent that such changes and modifications are embraced by the appended claims, it is to be understood that they constitute part of my invention.

What is claimed is:

1. The sodium salt of 3α-hydroxy-11,20-diketo pregnane 3-hemisuccinate.
2. The sodium salt of 3α-hydroxy-11,20-diketo pregnane 3-hemiglutarate.
3. The sodium salt of 3α-hydroxy-11,20-diketo pregnane 3-tricarballylate.
4. The ethanolamine salt of 3α-hydroxy-11,20-diketo pregnane 3-hemiglutarate.
5. The sodium salt of an acid ester of 3α-hydroxy-11,20-diketo pregnane and an aliphatic polycarboxylic acid having from four to eight carbon atoms.
6. A steroid compound from the group consisting of acid esters of 3α-hydroxy-11,20-diketopregnane and an aliphatic polycarboxylic acid having from 4 to 8 carbon atoms, and pharmacologically acceptable salts thereof.
7. Acid esters of 3α-hydroxy-11,20-diketopreganne and an aliphatic polycarboxylic acid having from 4 to 8 carbon atoms.
8. Pharmacologically acceptable salts of acid esters of 3α-hydroxy-11,20-diketopregnane and an aliphatic polycarboxylic acid having from 4 to 8 carbon atoms.
9. A pharmaceutical composition which comprises a compound as claimed in claim 8 together with a pharmaceutically acceptable carrier.
10. A compound selected from the group consisting of 3α-hydroxy-5β-pregnane-11,20-dione hydrogen succinate and the sodium salt thereof.

References Cited by the Examiner
UNITED STATES PATENTS

| | | | |
|---|---|---|---|
| 2,183,589 | 12/39 | Reichstein | 260—397.45 |
| 2,447,325 | 8/48 | Gallagher | 260—397.45 |
| 2,647,134 | 7/53 | Hogg et al. | 260—397.4 |
| 2,708,651 | 5/55 | Laubach | 260—397.4 |
| 2,713,588 | 7/55 | Nathan et al. | 260—397.45 |

LEWIS GOTTS, *Primary Examiner.*

H. SURLE, B. E. LANHAM, WALTER A. MODANCE, L. H. GASTON, *Examiners.*